US011988562B2

(12) United States Patent
Bloom

(10) Patent No.: US 11,988,562 B2
(45) Date of Patent: May 21, 2024

(54) INTERFEROMETER WITH AT LEAST ONE DISPERSIVE ELEMENT

(71) Applicant: Systems & Technology Research, LLC, Woburn, MA (US)

(72) Inventor: Scott Bloom, Encinitas, CA (US)

(73) Assignee: SYSTEMS & TECHNOLOGY RESEARCH, LLC, Woburn, MA (US)

( * ) Notice: Subject to any disclaimer, the term of this patent is extended or adjusted under 35 U.S.C. 154(b) by 0 days.

(21) Appl. No.: 17/701,847

(22) Filed: Mar. 23, 2022

(65) Prior Publication Data

US 2022/0326086 A1 Oct. 13, 2022

Related U.S. Application Data

(60) Provisional application No. 63/172,132, filed on Apr. 8, 2021.

(51) Int. Cl.
*G01J 9/02* (2006.01)
*G02B 5/30* (2006.01)

(52) U.S. Cl.
CPC .......... *G01J 9/0246* (2013.01); *G02B 5/3083* (2013.01); *G01J 2009/0226* (2013.01); *G01J 2009/0253* (2013.01); *G01J 2009/0284* (2013.01)

(58) Field of Classification Search
CPC ............. G01J 9/0246; G01J 2009/0226; G01J 2009/0253; G01J 2009/0284
See application file for complete search history.

(56) References Cited

U.S. PATENT DOCUMENTS

| 6,870,629 | B1 * | 3/2005 | Vogel | G01M 11/331 |
| | | | | 356/519 |
| 6,980,297 | B2 * | 12/2005 | Maeda | G01J 9/02 |
| | | | | 356/450 |
| 7,330,267 | B1 * | 2/2008 | Weitzel | G01J 3/453 |
| | | | | 356/456 |

(Continued)

OTHER PUBLICATIONS

Pati, G.S. et al. "Demonstration of a Tunable-Bandwidth White-Light Interferometer Using Anomalous Dispersion in Atomic Vapor". Physical Review Letters, 99, 113601, Sep. 27, 2007. (Year: 2007).*

*Primary Examiner* — Michael A Lyons
(74) *Attorney, Agent, or Firm* — KRIEGSMAN & KRIEGSMAN

(57) ABSTRACT

An interferometer for use in remote sensing systems includes a beam splitter that separates an input wave into a reflected wave, which travels along a first optical path within an upper interferometer arm, and a transmitted wave, which travels along a second optical path within a lower interferometer arm. The reflected and transmitted waves are subsequently recombined by the beam splitter for imaging onto a sensor. A highly dispersive element is incorporated into at least one of the pair of interferometer arms. Due to anomalous dispersion, a frequency shift in a wave transmitted through a dispersive element changes the optical path length within its corresponding arm. As a result, the recombined wave produces an interference pattern with a measurable phase change that can be utilized to calculate the original frequency shift in the input wave with great precision and potential sub-Hertz sensitivity.

6 Claims, 7 Drawing Sheets

(56) References Cited

U.S. PATENT DOCUMENTS

| | | | |
|---|---|---|---|
| 2006/0164648 A1* | 7/2006 | Howard | G01P 15/00 |
| | | | 356/450 |
| 2006/0221344 A1* | 10/2006 | Masuda | G01J 9/0246 |
| | | | 356/451 |
| 2009/0073450 A1* | 3/2009 | Boyd | G01B 9/02 |
| | | | 356/454 |
| 2011/0096335 A1* | 4/2011 | Levin | G01J 9/02 |
| | | | 356/484 |

* cited by examiner

INTERFEROMETER WITH AT LEAST ONE DISPERSIVE ELEMENT

CROSS-REFERENCE TO RELATED APPLICATIONS

The present application claims the benefit under 35 U.S.C. 119(e) to U.S. Provisional Patent Application No. 63/172,132, which was filed on Apr. 8, 2021, in the name of Scott Bloom, the disclosure of which is incorporated herein by reference.

FEDERALLY SPONSORED RESEARCH OR DEVELOPMENT

This invention was made with government support under contract number HR00111-18-C-0010 awarded by the Defense Advanced Research Projects Agency (DARPA). The government has certain rights in the invention.

FIELD OF THE INVENTION

The present invention relates generally to the field of interferometry and, more particularly, to the use of interferometers in remote sensing systems.

BACKGROUND OF THE INVENTION

Interferometry is a measurement technique which relies upon the principle of interference between superimposed waves, such as light, radio, or sound waves, to extract information about objects with which the waves interact and/or characteristics of the waves themselves. As such, interferometry serves as a valuable measurement tool, which is commonly utilized in various applications throughout science, technology, and medicine.

For instance, interferometry is often incorporated into remote sensing systems, such as Doppler-based sensing systems, to obtain velocity data for remote objects. Specifically, any variance in the frequency of a wave propagating between two objects can be measured using interferometry and, in turn, utilized to calculate the relative rate of movement between the two objects. Accordingly, interferometry has particular usefulness in radar systems used in navigation, weather forecasting, and the like.

A Michelson interferometer is one type of interferometer which is well known and widely used in a variety of applications, including Doppler-based sensing systems. In FIG. 1, a conventional configuration of a Michelson interferometer is shown, the interferometer being identified generally by reference numeral 11. As can be seen, interferometer 11 comprises a light source 13 which is configured to produce an input beam of coherent light 15. A beam splitter 17 is designed to reflect a portion of light beam 15 along a first light optical path located within a first interferometric arm 19-1 and to transmit a portion of light beam 15 along a second optical path located within a second interferometric arm 19-2.

Reflected light 21 traveling along the first optical path within first, or upper, interferometer arm 19-1 is redirected by a first mirror 23-1 back towards splitter 17. Similarly, transmitted light 25 traveling along the second optical path within second, or lower, interferometric arm 19-2 reflects off a second mirror 23-2 back towards splitter 17. Reflected light 21 and transmitted light 25 recombine through superposition to form recombined light 27 which is directed by splitter 17 towards a light sensor 29, such as a camera or photoelectric detector. Any spatial misalignment between the travel paths of reflected light 21 and transmitted light 25 produces an interference pattern in recombined light 27 that is detectable by sensor 29. For this reason, one of mirrors 23 is often slightly misaligned in relation to the other to produce an optimal infringement pattern.

Characteristics of the interference pattern caused by attributes of the source light 15 (e.g., wavelength) as well as the precise position of each mirror 23 relative to splitter 17 can, in turn, be used to calculate acute measurements (i.e., measurements smaller than the wavelength of source light 15). Accordingly, optical interferometry is widely utilized to perform microscopic measurements, such the detection of surface irregularities with nanometer precision.

Although interferometry is often utilized in remote sensing systems, it has been found that a conventional Michelson interferometer has a relatively limited degree of sensitivity in measuring frequency changes. Notably, very small changes in source wave frequency (e.g., 1 MHz frequency shifts) often produce an indistinguishable variance in phase and therefore exhibit minimal interference. As a result, traditional interferometers have limitations in remote sensing systems which require very high precision measurements, such as flowmeters, collision-detection systems, and medical-imaging machines.

SUMMARY OF THE INVENTION

In view thereof, it is an object of the present invention to provide a novel interferometer.

It is another object of the present invention to provide an interferometer which is designed to measure acute shifts in the frequency of a source wave with great precision.

It is yet another object of the present invention to provide an interferometer of the type as described above which can be readily integrated into a remote sensing system.

It is still another object of the present invention to provide an interferometer of the type as described above which can be readily integrated into a Doppler-based sensing system.

It is yet still another object of the present invention to provide an interferometer of the type as described above which has a limited number of parts, is inexpensive to implement, is compact in size, and relies upon limited computational complexity.

Accordingly, as one feature of the present invention, there is provided an interferometer for measuring a frequency shift in an input wave, the interferometer comprising (a) a splitter, the splitter reflecting a first portion of the input wave along a first path located within a first interferometer arm, the splitter transmitting a second portion of the input wave along a second path located within a second interferometer arm, and (b) a dispersive element located within at least one of the first and second paths, (c) wherein a shift in frequency of a wave transmitted through the dispersive element modifies the path within its corresponding interferometer arm.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings, wherein like reference numerals represent like parts.

DETAILED DESCRIPTION OF THE INVENTION

Interferometer 111

Figure 2:
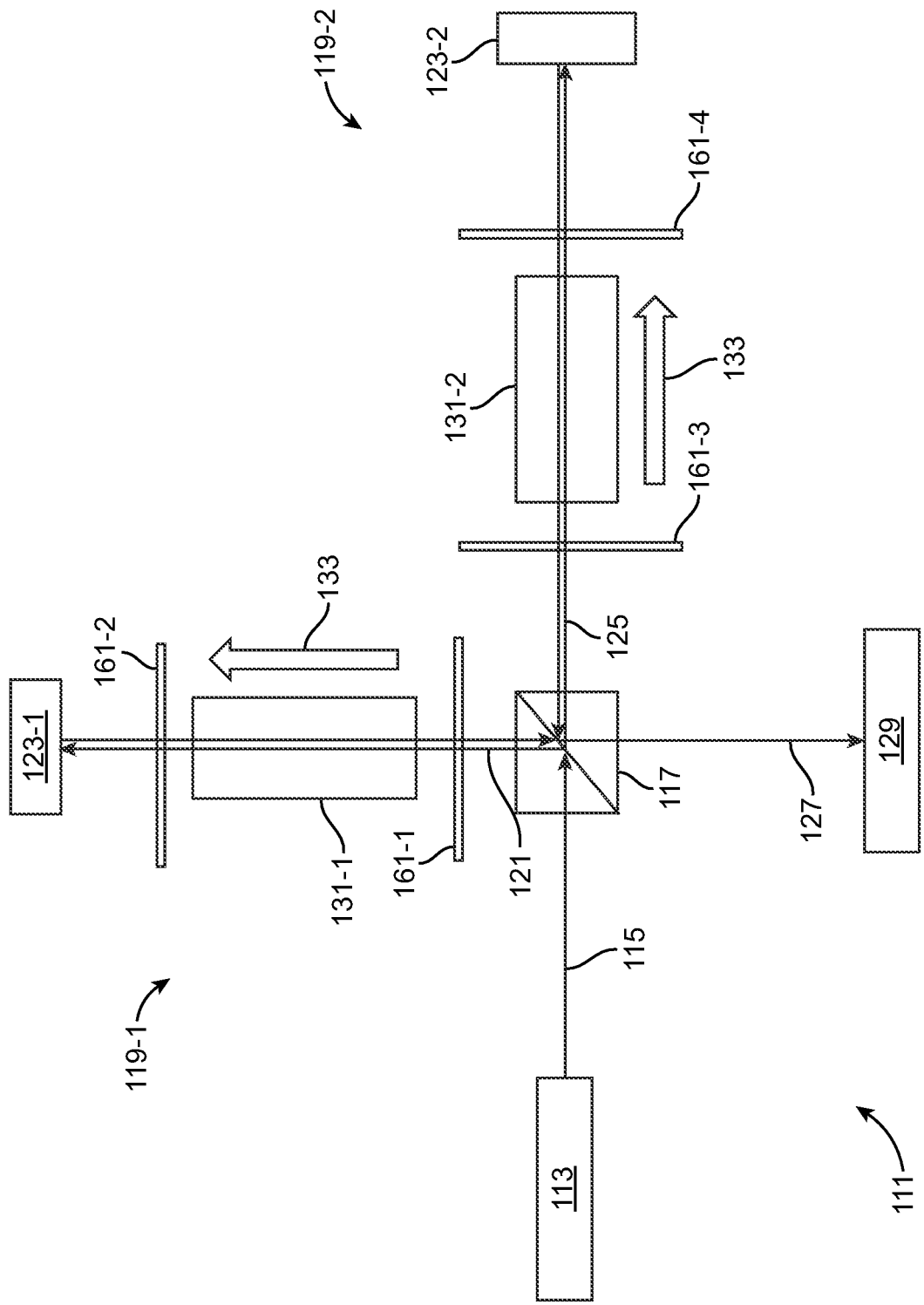
FIG. 2 is a simplified schematic representation of an interferometer constructed according to the teachings of the present invention.

Referring now to FIG. 2, there is shown a simplified schematic representation of an interferometer constructed according to the teachings of the present invention, the interferometer being identified generally by reference numeral 111. As will be explained in detail below, highly dispersive elements are incorporated into each arm of interferometer 111 in order to convert very small shifts in the frequency of a source wave into measurable changes in phase. As a result, interferometer 111 is uniquely designed to detect and calculate very small frequency shifts on an interferogram.

It is envisioned that interferometer 111 is particularly well suited for use in remote sensing applications, such as Doppler-based sensing systems, which measure changes in the frequency of a source wave to obtain velocity data for remote objects. However, it should be noted that interferometer 111 is not limited for use in remote sensing applications. Rather, it is to be understood that the principles of interferometer 111 could be utilized in any application which requires the precise measurement of changes in frequency.

As can be seen, interferometer 111 is similar to conventional interferometer 11 in that interferometer 111 comprises a light source 113 which is configured to produce an input beam of coherent light 115. A beam splitter 117 is designed to reflect a first portion of input, or source, light 115 along a first optical path located within a first interferometer arm 119-1 and to transmit a second portion of source light 115 along a second optical path located within a second interferometer arm 119-2.

Reflected light 121 traveling along the optical path within first, or upper, interferometer arm 119-1 is redirected by a first mirror 123-1 back towards splitter 117. Similarly, transmitted light 125 traveling along the optical path within second, or lower, interferometer arm 119-2 reflects off a second mirror 123-2 back towards splitter 117. Reflected light 121 and transmitted light 125 recombine through superposition to form recombined light 127 which is directed by splitter 117 towards a light sensor 129, such as a camera or photoelectric detector. As a basic principle of interferometry, any spatial misalignment between the travel paths of reflected light 121 and transmitted light 125 produces an interference pattern in recombined light 127 that is detectable by sensor 129. In the present embodiment, one of mirrors 123 is preferably tilted approximately 0.01 degrees in relation to the other (i.e., away from an exact orthogonal relationship) in order to produce an optimal infringement pattern.

Interferometer 111 differs primarily from prior art interferometer 11 in that interferometer 111 incorporates a first dispersive element 131-1 into upper interferometer arm 119-1 and a second dispersive element 131-2 into lower interferometer arm 119-2. As will be explained further in detail below, the phenomenon of anomalous dispersion causes the index of refraction of a light wave traveling through each highly dispersive element 131 to vary in direct relation to its frequency. The present invention exploits this phenomenon to change the length of the optical path within each interferometer arm 119 in relation to the frequency of input wave 115. As a result, adjusting the length of travel path within each interferometer arm 119 imparts a significant phase change in the fringe pattern detected by sensor 129. Therefore, using a predetermined algorithm, a very small change in the frequency of a source wave 115 can be calculated with great precision by measuring the phase change in the fringe pattern appearing in a corresponding interferogram. As such, interferometer 111 can be utilized as a very sensitive wavelength shift detector.

Each dispersive element 131 is preferably in the form of an alkali vapor cell (i.e., an alkali atomic gas retained within a sealed chamber) that is located within an applied magnetic field 133 of moderate size (e.g., no greater than a few thousand gauss). It should be noted that any alkali vapor that causes anomalous dispersion may be used to form the alkali vapor cell. Preferably, the type of alkali vapor selected exhibits optimal anomalous dispersion based on the operational wavelength of source light 115. For instance, in the present embodiment, cesium vapor is selected due to its highly dispersive characteristics for input light having a wavelength of approximately 852 nm.

Figure 3:
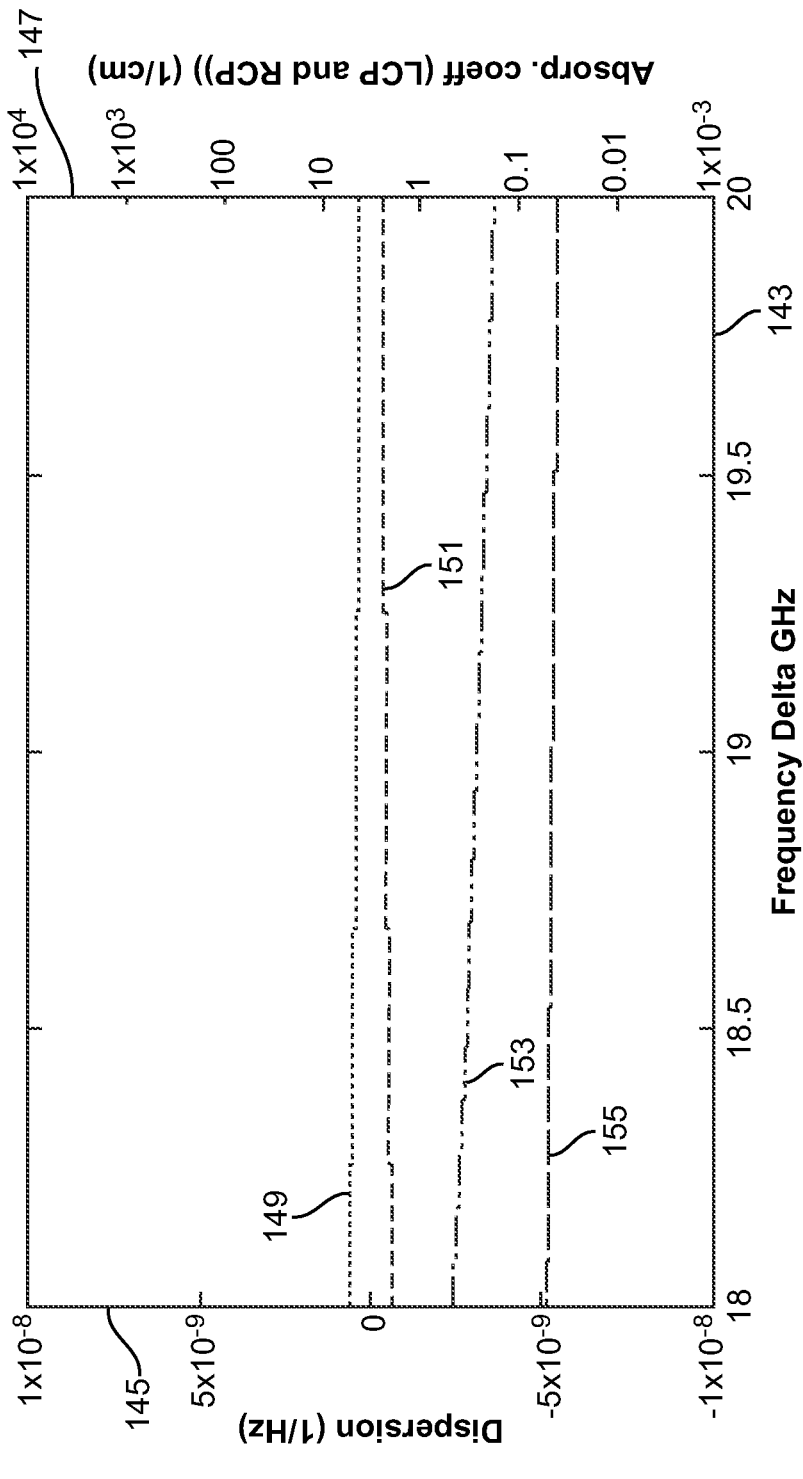
FIG. 3 is a graph which illustrates the degree of anomalous dispersion occurring in cesium vapor.

In FIG. 3, a cesium vapor characteristics graph 141 is shown which illustrates the degree of anomalous dispersion exhibited by cesium vapor as an input light source varies in frequency. In graph 141, dispersion characteristics of cesium vapor are represented along horizontal axis 143 in terms of frequency change (GHz), along one vertical axis 145 in terms of dispersion (1/Hz) and along opposing vertical axis 147 in terms of the absorption coefficient (1/cm). In the atomic physics model, cesium vapor is heated to 150° C. and the magnetic field applied thereto is 2000G. Graph 141 depicts the degree of right-handed, circularly polarized (RCP) dispersion 149, left-handed, circularly polarized (LCP) dispersion 151, right-handed, circularly polarized (RCP) absorption 153, and left-handed, circularly absorption (LCP) absorption 155 exhibited in response to a frequency shift of approximately 2 GHz applied to an input light wave with a wavelength of approximately 852 nm.

As evidenced in graph 141, a 2 GHz frequency shift in the input light creates a significant change in the refractive index of the cesium vapor. As noted previously, this considerable variance in the index of refraction of the cesium vapor is, in turn, utilized to introduce a measurable phase change between fringes of the detected infringement pattern.

Referring back to FIG. 2, in addition to highly dispersive elements 131, interferometer 111 also differs from prior art interferometer 11 in that interferometer 111 includes a plurality of quarter-wave plates 161 for preparing light for transmission through dispersive elements 131. Specifically, quarter-wave plates 161-1 and 161-2 are located within upper arm 119-1 on opposite sides of dispersive element 131-1. Each of quarter-wave plates (QWP) 161-1 and 161-2 is orientated at +45 degrees with respect to the linear input polarization of reflected light 121. Accordingly, upon reflection from splitter 117, linearly polarized reflected light 121 is converted into left-handed, circularly polarized (LCP) light by quarter-wave plate 161-1 before passing through dispersive element 131-1. Thereafter, reflected light 121, which is LCP light, is converted back into linearly polarized light by quarter-wave plate 161-2. As light 121 reflects off mirror 123-1 and back to splitter 117, each of quarter-wave plates 161-1 and 161-2 polarizes light in the opposition manner as set forth above. Therefore, reflected light 121 traveling along upper arm 119-1 returns to splitter 117 as linearly polarized light.

Similarly, quarter-wave plates 161-3 and 161-4 are located within lower arm 119-2 on opposite sides of dispersive element 131-1. Each of quarter-wave plates (QWP) 161-3 and 161-4 is orientated at −45 degrees with respect to the linear input polarization of transmitted light 125. Accordingly, upon transmission through splitter 117, linearly polarized transmitted light 125 is converted into right-handed, circularly polarized (RCP) light by quarter-wave plate 161-3 before passing through dispersive element 131-2. Thereafter, transmitted light 125, which is RCP light, is converted back into linearly polarized light by quarter-wave plate 161-4. As light 125 reflects off mirror 123-2 and back to splitter 117, each of quarter-wave plates 161-3 and 161-4 polarizes light in the opposition manner as set forth above. Therefore, transmitted light 125 traveling along lower arm 119-2 returns to splitter 117 as linearly polarized light.

It should be noted that the dispersion difference between LCP light and RCP light (as evidenced in FIG. 3) further enhances the change in optical path length established between the pair of interferometer arms 119. As a result, interferometer 111 is able to measure frequency drift with even greater sensitivity.

It has been found that the incorporation of highly dispersive elements 131 into interferometer arms 119 renders interferometer 111 considerably more sensitive to frequency shifts than conventional interferometers, such as prior art interferometer 11. In fact, depending on the type of alkali vapor utilized for each dispersive element 131 as well as the original optical pathlength within each interferometer arm 119, it is anticipated that interferometer 111 can realize gains of approximately 30-50 dB in measured fringe shifts in response to a source light wavelength change.

More specifically, an estimate of the phase change derived by interferometer 111 is set forth below in the following equation:

$$\varphi = \frac{2\pi l}{\frac{\lambda}{n}} \quad [1]$$

where $\varphi$ is the phase change, l is the optical path length within each interferometer arm 119, $\lambda$ is the wavelength of source light 115, and n is the non-constant index of refraction of each dispersive element 131. Therefore, the frequency dependency (i.e., the change in phase relative to change in frequency) of interferometer 111 can be represented as:

$$\frac{d\phi}{df} \sim \frac{1}{c}\frac{dn}{df_{vapor}} \cdot f \quad [2]$$

where c is the speed of light, dn is the change in the refractive index of each dispersive element 131, $df_{vapor}$ is the change in frequency of input light 115 caused by each dispersive element 131, and f is the original frequency of input light 115. Using cesium vapor as dispersive element 131, a 1 Hz change in the frequency of input light 115 yields a corresponding change in phase of the measured fringe pattern of approximately 6 microrads/Hz. This considerable phase shift potentially enables interferometer 111 to detect sub-Hertz frequency shifts, which is a significant improvement in sensitivity as compared to conventional interferometers.

Design Modifications and Alternate Embodiments

The invention described in detail above is intended to be merely exemplary and those skilled in the art shall be able to make numerous variations and modifications without departing from the spirit of the present invention. All such variations and modifications are intended to be within the scope of the present invention as defined in the appended claims.

Figure 4:
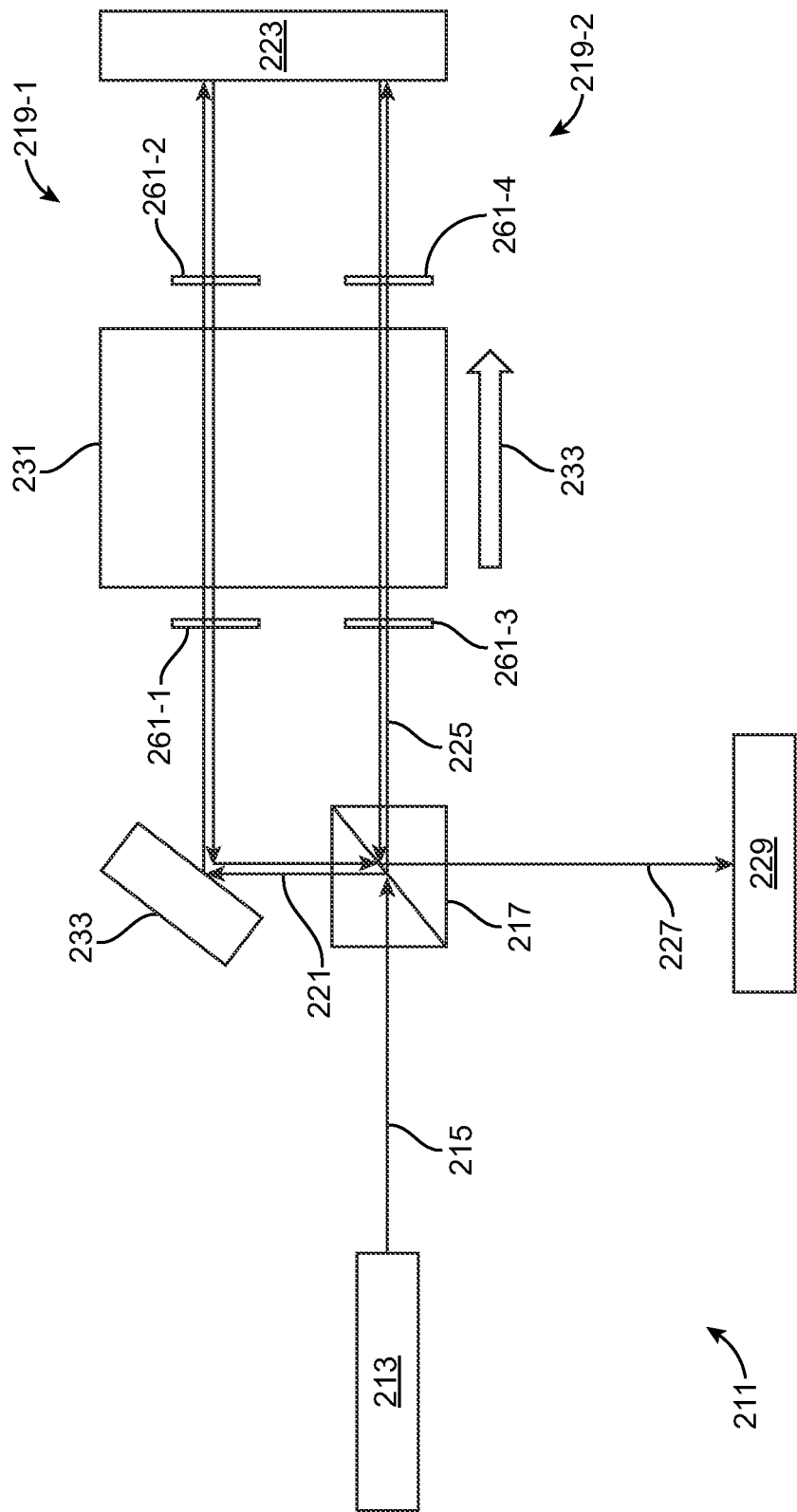
FIG. 4 is a simplified schematic representation of a first modified version of the interferometer shown in FIG. 2.

For example, in FIG. 4, there is shown a simplified schematic representation of another embodiment of an interferometer constructed according to the teachings of the present invention, the interferometer being identified generally by reference numeral 211. As can be seen, interferometer 211 is similar to interferometer 111 in that interferometer 211 comprises a light source 213 which is configured to produce an input beam of coherent light 215. A beam splitter 217 is designed to reflect a first portion of input, or source, light 215 along a first optical path located within a first interferometer arm 219-1 and to transmit a second portion of source light 215 along a second optical path located within a second interferometer arm 219-2.

Reflected light 221 traveling along the optical path within first, or upper, interferometer arm 219-1 is redirected by a mirror 223 back towards splitter 217. Similarly, transmitted light 225 traveling along the optical path within second, or lower, interferometer arm 219-2 reflects off mirror 223 back towards splitter 217. Reflected light 221 and transmitted light 225 recombine through superposition to form recombined light 227 which is directed by splitter 217 towards a light sensor 229, such as a camera or photoelectric detector.

Interferometer 211 is similar to interferometer 111 in that interferometer 211 incorporates a highly dispersive element into each arm of interferometer 211 in order to convert very small shifts in the frequency of a source wave into measurable changes in phase. Preferably, dispersive element 231 is in the form of an alkali vapor cell that is located within an applied magnetic field 233 of moderate size. As a result, dispersive element 231 creates a modification in the optical path length within each interferometer arm 219 in response to changes in frequency of input light 215, thereby enabling interferometer 211 to measure frequency drift with enhanced sensitivity.

However, interferometer 211 differs from interferometer 111 in that a single, common, dispersive element 231 is utilized for both interferometer arms 219. More specifically, a turning mirror 233 is situated within the optical light path within upper arm 219-1 in order to direct reflected light 221 into dispersive element 231 in a near parallel relationship relative to the optical light path within lower arm 219-2.

Additionally, quarter-wave plates 261-1 and 261-2 are located within upper arm 219-1 on opposite sides of dispersive element 213, with each of quarter-wave plates 261-1 being orientated at +45 degrees with respect to the linear input polarization of reflected light 121. Furthermore, quarter-wave plates 261-3 and 261-4 are located within lower arm 219-2 on opposite sides of dispersive element 231, with each of quarter-wave plates 261-3 and 261-4 orientated at −45 degrees with respect to the linear input polarization of transmitted light 225.

The use of a single dispersive element 231 for both arms 219 of interferometer 211 introduces a pair of notable advantages.

As a first advantage, the use of a single dispersive element 231 ensures that the dispersive characteristics of the alkali gas are standardized for both interferometer arms 219-1 and 219-2. More specifically, the vapor density, maintained temperature, and magnetic field can be more effectively stabilized for both interferometer arms 219-1 and 219-2. As a result, interferometer 211 is rendered more precise in measuring wavelength changes.

As a second advantage, the use of a single dispersive element 231 renders interferometer 211 more compact in nature as well as less expensive to implement. Accordingly, interferometer 211 is adapted to be more seamlessly integrated into its designated application.

As another potential modification to the design of interferometer 111, it is to be understood that a dispersive element 131 could be integrated into only one of the two interferometer arms 119. Furthermore, it should be noted that the single dispersive element 131 need not rely upon alkali metal vapors to create anomalous dispersion.

Figure 5:
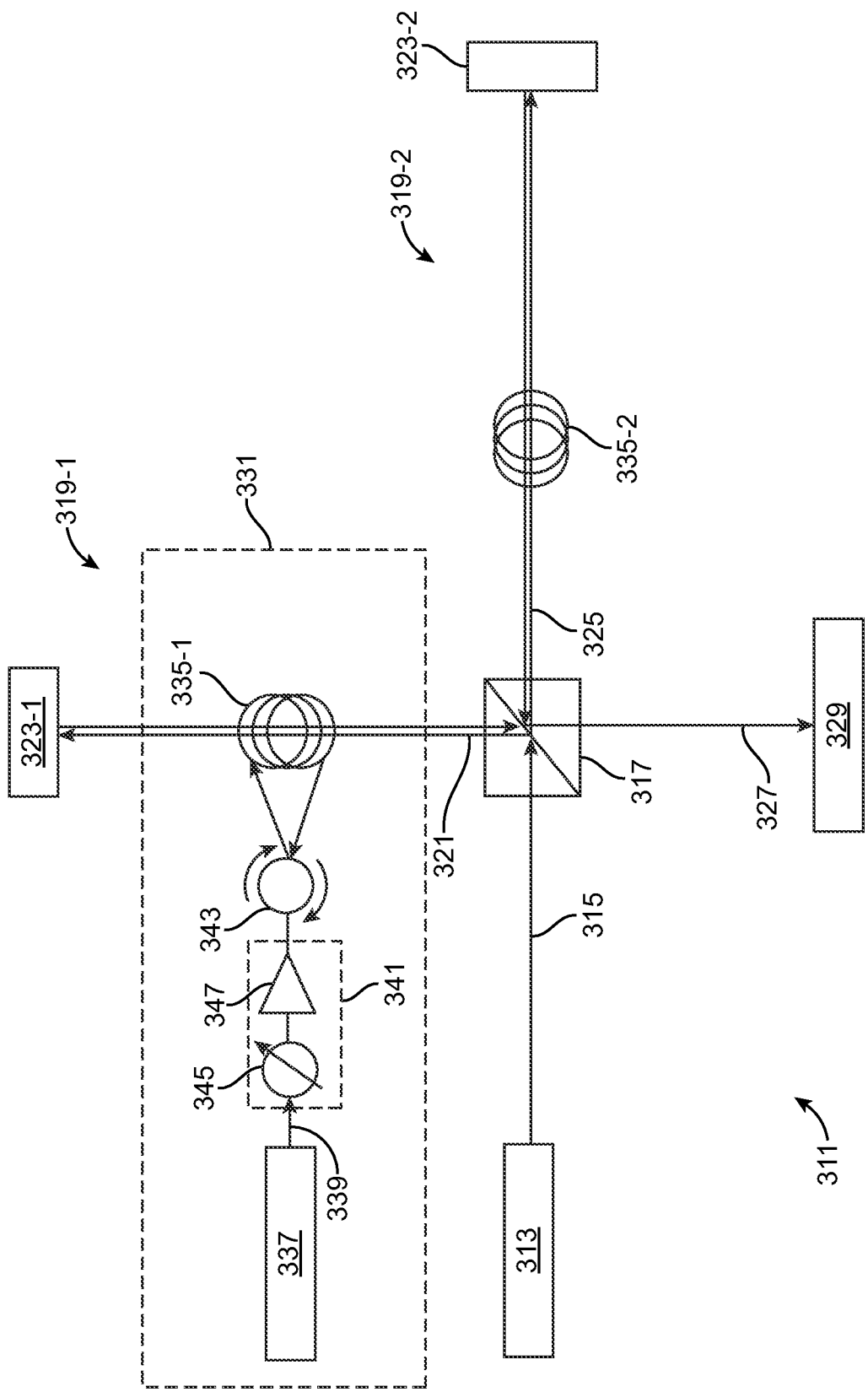
FIG. 5 is a simplified schematic representation of a second modified version of the interferometer shown in FIG. 2.

Notably, in FIG. 5, there is shown a simplified schematic representation of another embodiment of an interferometer constructed according to the teachings of the present invention, the interferometer being identified generally by reference numeral 311. As can be seen, interferometer 311 is similar to interferometer 111 in that interferometer 311 comprises a light source 313 which is configured to produce an input beam of coherent light 315. A beam splitter 317 is designed to reflect a first portion of input, or source, light 315 along a first optical path located within a first interferometer arm 319-1 and to transmit a second portion of source light 315 along a second optical path located within a second interferometer arm 319-2.

Reflected light 321 traveling along the optical path within first, or upper, interferometer arm 319-1 is redirected by a first mirror 323-1 back towards splitter 317. Similarly, transmitted light 325 traveling along the optical path within second, or lower, interferometer arm 319-2 reflects off a second mirror 323-2 back towards splitter 317. Reflected light 321 and transmitted light 325 recombine through superposition to form recombined light 327 which is directed by splitter 317 towards a light sensor 329, such as a camera or photoelectric detector.

Interferometer 311 is similar to interferometer 111 in that interferometer 311 incorporates a highly dispersive element 331 into its design in order to convert very small shifts in the frequency of a source wave into measurable changes in phase. However, interferometer 311 differs from interferometer 111 in that interferometer 311 incorporates a dispersive element 331 into only one of its pair of interferometer arms 319. Additionally, the construction of dispersive element 331 does not rely upon alkali metal vapors to create anomalous dispersion. Rather, dispersive element 331 relies upon Stimulated Brillouin Scattering (SBS) to produce dispersion.

Specifically, dispersive element 331 includes a first length of fiberoptic cable 335-1, or other similar glass medium, positioned along the optical path within upper interferometer arm 319-1. Additionally, dispersive element 331 comprises (i) a secondary light source 337 for supplying at least one pulse of light 339, (ii) an amplification device 341 for increasing the energy of light pulse 339, and (iii) a three-port circulator 343 for delivering light pulse 339 to/from fiberoptic cable 335 along a one-directional path. As shown herein, amplification device 341 includes a Variable Optical Attenuator (VOA) 345 for incrementally adjusting the power of light pulse 339 and an Erbium-Doped Fiber Amplifier (EDFA) 347 for boosting the power of light pulse 339 to induce SBS.

The energy from light pulse 339 induces the condition of SBS within fiberoptic cable 335-1 which, in turn, creates dispersion (i.e., longer wavelengths) in waves transmitted therethrough. The degree of dispersion within fiberoptic cable 335-1 is dependent upon, inter alia, the length of fiberoptic cable 335-1 as well as the power of pulsed light 339.

Preferably, light pulse 339 is delivered to fiberoptic cable 335-1 at a frequency that approximates the Brillouin gain offset frequency for input pulse 315. Pulsing fiberoptic cable 335-1 with Brillouin-shifted light induces dispersion at the frequency for input signal 315. As a result of the dispersion, a frequency shift in input signal 315 creates a sizable shift in phase (i.e., a time delay) which can be readily measured in the detected interference pattern.

As can be appreciated, the size of the phase shift created by dispersive element 331 is a function of the degree of the frequency shift in input signal 315, the length of interferometer arms 319, and the strength of the induced dispersion produced via SBS. Accordingly, the induced time delay is preferably optimized to maximize frequency shift detection sensitivity. Theoretically, a time delay in the order of $10^{-11}$ seconds is obtainable by inducing SBS in fiberoptic cable 335-1 in the manner as set forth above.

It should be noted that although a secondary light source 337 is shown, the energy used to induce SBS in fiberoptic cable 335-1 could be alternatively supplied from principal light source 313 and amplified, as needed, by amplification device 341. Additionally, although a second length of fiberoptic cable 335-2, or other similar glass medium, is shown positioned along the optical path within lower interferometer arm 319-2, it is to be understood that fiberoptic cable 335-2 need not be pulsed with energy to induce SBS, since a sufficient phase change can be measured through the use of a single dispersive element. 331.

Inducing SBS within fiberoptic cable 335-1 creates a significant degree of dispersion that is largely independent of the wavelength of source wave 315. As a result, interferometer 311 can be effectively utilized in a broader range of potential applications, since the frequency of the pulsed light 339 provided by secondary light source 337 to induce SBS can be simply adjusted to accommodate for the intended use.

Measured Test Results Achieved Using
Interferometer 111

Figure 1:
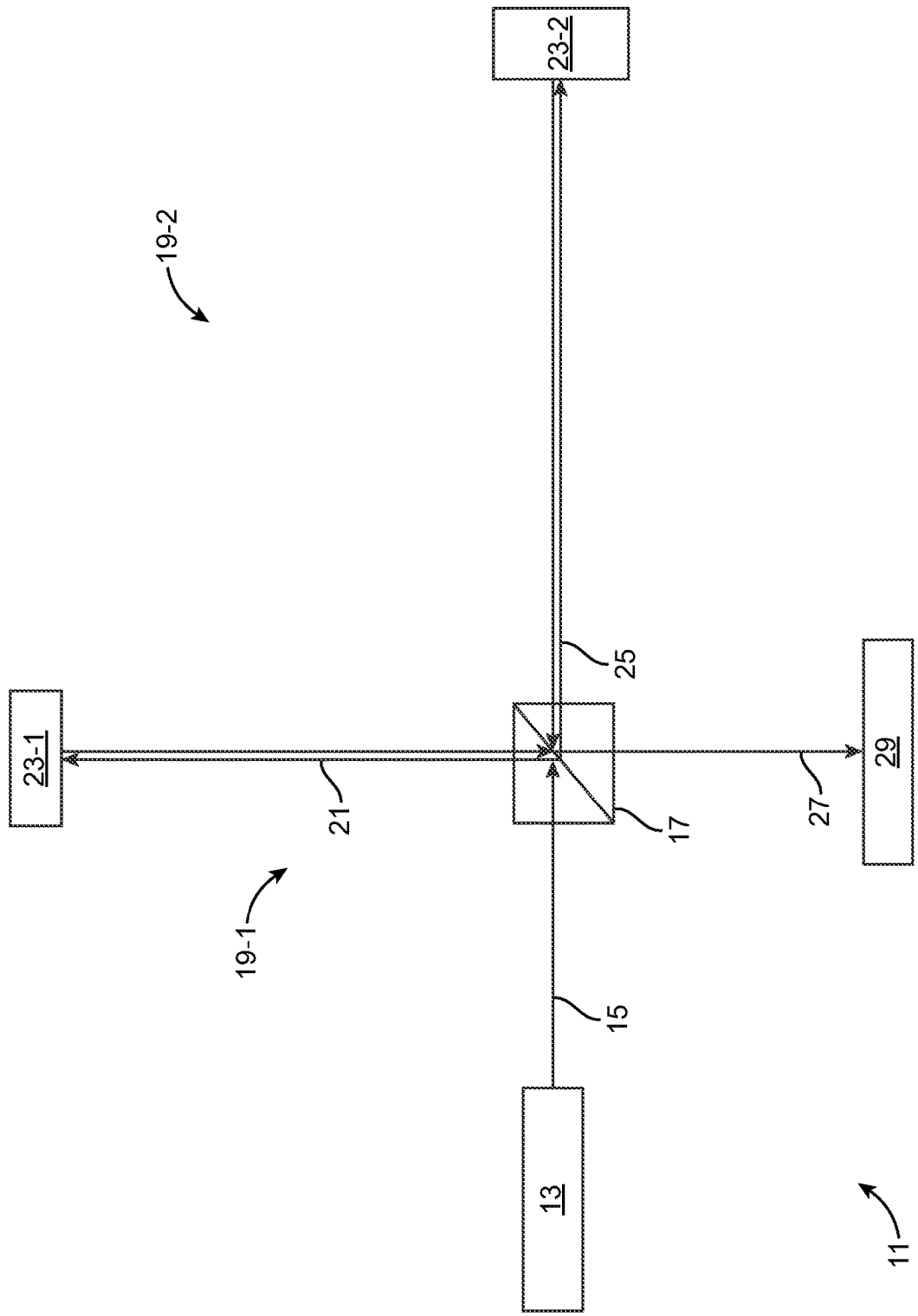
FIG. 1 is a simplified schematic representation of an interferometer which is well known in the art.

As referenced above, interferometer 111 is uniquely designed to measure acute changes in frequency of a source wave, thereby rendering interferometer 111 highly useful in a wide array of potential applications, such as doppler-based remote sensing systems. For comparative purposes, interferometer 111 was tested in relation to a conventional Michelson interferometer of the type as shown in FIG. 1. The results of the aforementioned testing are detailed below. The following results are provided for illustrative purposes only and are not intended to limit the scope of the present invention.

Figure 6:
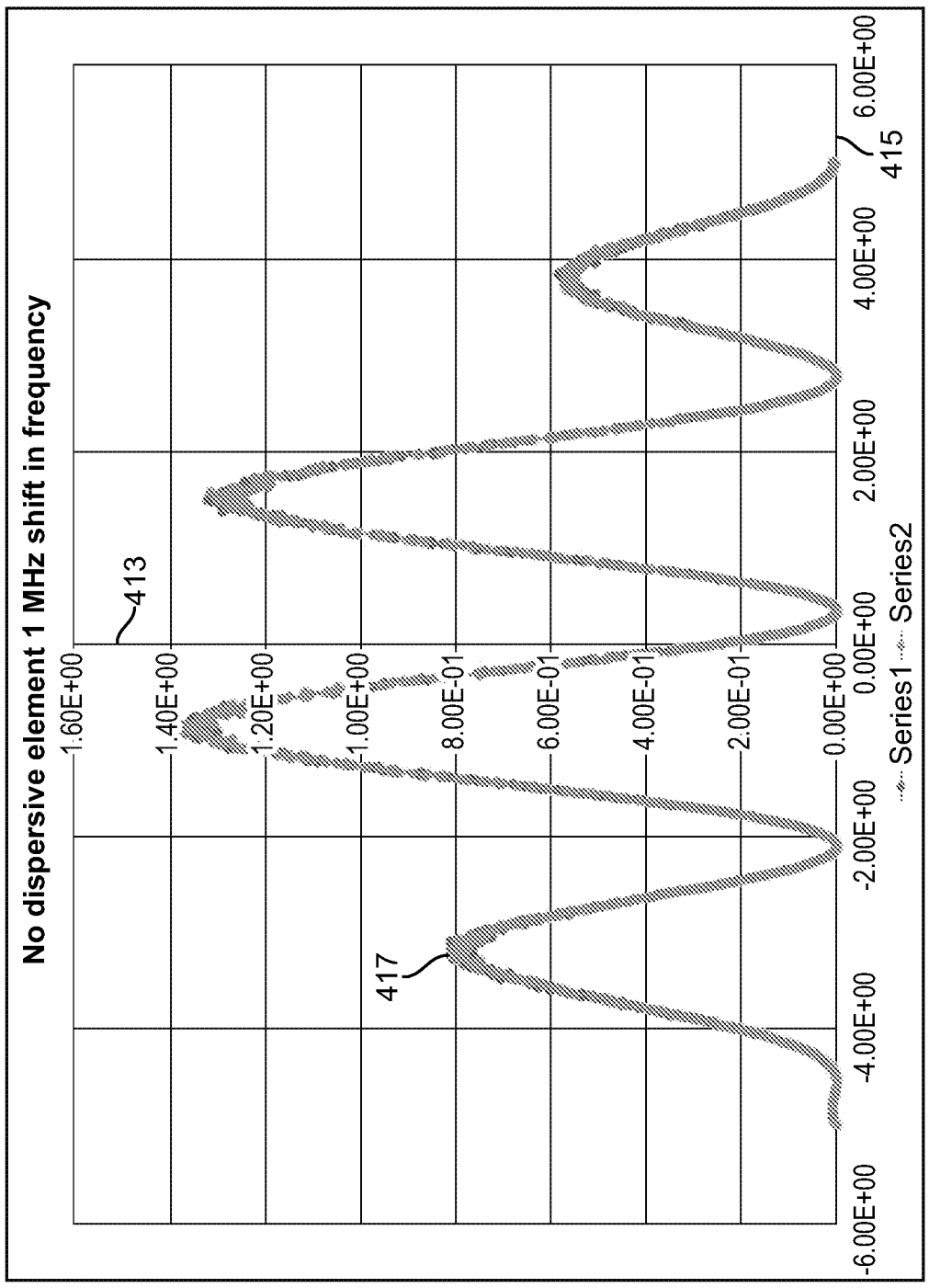
FIG. 6 is an actual interferogram produced by a prior art interferometer upon receiving a pair of source waves having a variance in frequency of approximately 1 MHz.

Specifically, in FIG. 6, an interferogram 411 is shown which illustrates the cross-section of fringe patterns produced by a pair of source waves transmitted into conventional interferometer 11, the pair of source waves having a variance in frequency of approximately 1 MHz. In interferogram 411, the detected fringe patterns are represented along vertical axis 413 in terms of intensity and along horizontal axis 415 in terms of position, or pixel coordinates.

As can be seen, the resultant fringe patterns substantially overlap one another and thereby yield only a single detectable fringe pattern 417. Due to the lack of separation in the resultant fringe patterns, algorithms cannot be applied to the measured results to calculate the small frequency variance between source waves.

Figure 7:
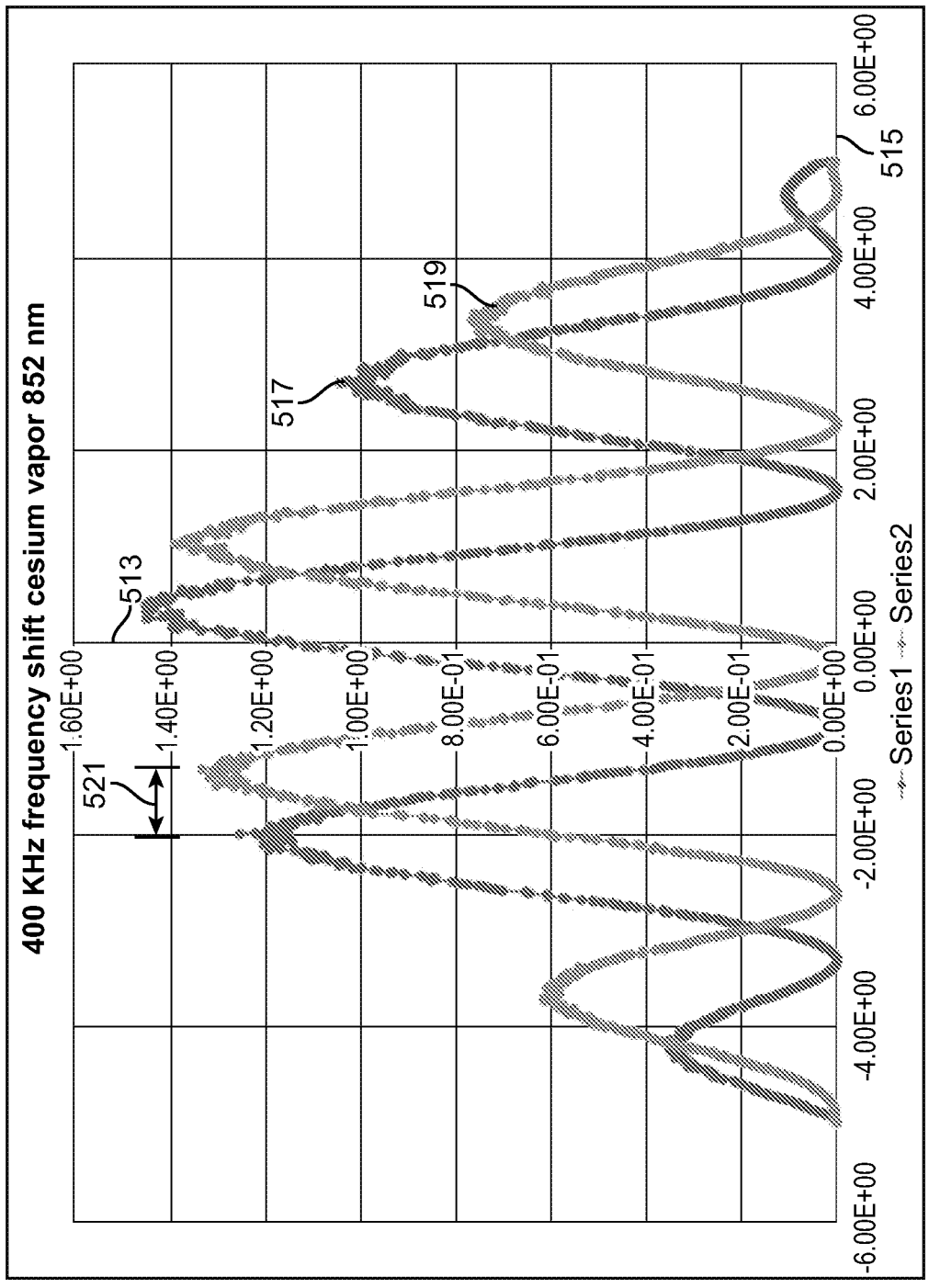
FIG. 7 is an actual interferogram produced by the interferometer shown in FIG. 2 upon receiving a pair of source waves having a variance in frequency of approximately 400 KHz.

By comparison, in FIG. 7, an interferogram 511 is shown which illustrates how the incorporation of highly dispersive elements 131 into interferometer 111 enables very small shifts in the frequency of a source wave to be represented in the detected fringe pattern of an interferogram and, in turn, precisely calculated. Specifically, in the test model, a pair of source waves with frequency shift of approximately 400 KHz is transmitted into interferometer 111. In FIG. 7, the cross-section of the fringe patterns produced by the pair of frequency-shifted source waves is represented along vertical axis 513 in terms of intensity and along horizontal axis 515 in terms of position, or pixel coordinates.

As can be seen, first and second fringe patterns 517 and 519 are detected which are visually separate from one another, with first fringe pattern 517 corresponding to a first series of source waves at a first frequency and second fringe pattern 519 corresponding to a second series of source waves at a second frequency which is approximately 400 KHz less than the first frequency.

It is readily apparent that the inclusion of dispersive elements 131 creates a measurable phase shift 521 between fringe patterns 517 and 519. In the present example, the introduction of a frequency shift of approximately 400 KHz yields a sizable phase shift 521. In fact, the simulated sensitivity of interferometer 111 is approximately 8 microrads/Hz, whereas a conventional interferometer 11 typically has a measurable sensitivity of less than 1 microrad/Hz.

Accordingly, any small shift in frequency of a source wave can be algorithmically calculated by measuring the detected phase shift between fringe patterns on an interferogram produced by interferometer 111. Due to its novel construction, interferometer 111 is rendered highly sensitive to frequency shifts, with changes in wave frequency detectable at potentially sub-Hertz levels.

What is claimed is:

1. An interferometer for measuring a frequency shift in an input wave, the interferometer comprising:

(a) a splitter, the splitter reflecting a first portion of the input wave along a first path located within a first interferometer arm, the splitter transmitting a second portion of the input wave along a second path located within a second interferometer arm, wherein each of the first and second portions of the input wave are reflected back to the splitter to yield a recombined wave, the recombined wave producing an interference pattern; and (b) a common dispersive element located within both the first path in the first interferometer arm and the second path in the second interferometer arm;

(c) wherein a shift in frequency of a wave transmitted through the dispersive element modifies the path within its corresponding interferometer arm, wherein a change in the path with an interferometer arm caused by a frequency shift in the input wave creates a corresponding phase change in the interference pattern, the corresponding phase change in the interference pattern being utilized to calculate the frequency shift in the input wave.

2. The interferometer as claimed in claim 1 further comprising a turning mirror for redirecting one of the first and second paths into a substantially parallel relationship relative to the other of the first and second paths.

3. An interferometer for measuring a frequency shift in an input wave, the interferometer comprising:

(a) a splitter, the splitter reflecting a first portion of the input wave along a first path located within a first interferometer arm, the splitter transmitting a second portion of the input wave along a second path located within a second interferometer arm, wherein each of the first and second portions of the input wave are reflected back to the splitter to yield a recombined wave, the recombined wave producing an interference pattern;

(b) a dispersive element located in each of the first and second paths; and (c) a first pair of quarter-wave plates located in the first path on opposite sides of the dispersive element in the first interferometer arm;

(d) wherein a shift in frequency of a wave transmitted through the dispersive element modifies the path within its corresponding interferometer arm, wherein a change in the path with an interferometer arm caused by a frequency shift in the input wave creates a corresponding phase change in the interference pattern, the corresponding phase change in the interference pattern being utilized to calculate the frequency shift in the input wave.

4. The interferometer as claimed in claim 3 wherein a second pair of quarter-wave plates is located in the second path on opposite sides of the dispersive element in the second interferometer arm.

5. The interferometer as claimed in claim 4 wherein each of the first pair of quarter-wave plates is orientated at +45 degrees with respect to linear polarization of the input wave.

6. The interferometer as claimed in claim 5 wherein each of the second pair of quarter-wave plates is orientated at −45 degrees with respect to linear polarization of the input wave.

* * * * *